UNITED STATES PATENT OFFICE.

HEINRICH THRON AND CARL FREUND, OF FRANKFORT-ON-THE-MAIN, GERMANY, ASSIGNORS TO VEREINIGTE CHININFABRIKEN ZIMMER & CO., G. M. B. H., OF FRANKFORT-ON-THE-MAIN, GERMANY.

MANUFACTURE AND PRODUCTION OF ALKYL DERIVATIVES AND SUBSTITUTED ALKYL DERIVATIVES OF HYDROCUPREINE.

1,062,203.  Specification of Letters Patent.  Patented May 20, 1913.

No Drawing.  Application filed July 23, 1912. Serial No. 711,105.

*To all whom it may concern:*

Be it known that we, HEINRICH THRON and CARL FREUND, both subjects of the German Emperor, and residents of Frankfort-on-the-Main, Germany, have invented certain new and useful Improvements in the Manufacture and Production of Alkyl Derivatives and Substituted Alkyl Derivatives of Hydrocupreine, of which the following is a specification.

The alkyl derivatives and the substituted alkyl derivatives of hydrocupreine have (with the exception of hydroquinin) not hitherto been known. According to this invention these new compounds (which possess valuable properties) and also hydroquinin are synthetically produced by treating hydrocupreine (apohydroquinin) in a suitable manner with alkylizing agents.

The following examples illustrate the manner in which the invention can be carried out, but the invention is not limited to these precise examples. The parts are by weight.

Example 1: 312 parts of hydrocupreine (1 molecular proportion) are added to a solution of 23 parts of sodium (1 atomic proportion) in 1000 parts of methyl alcohol, and then 116 parts of dimethyl sulfate (1 molecular proportion) are allowed to run, drop by drop, into the mixture while being cooled with ice. After being left to stand for several hours the mixture is acidified with dilute sulfuric acid, the alcohol is distilled off and the residue is shaken with dilute soda lye and ether. After concentrating the ether, the hydroquinin, or methyl-hydrocupreine, crystallizes out in fine white needles which melt at 172° centigrade.

Example II: 312 parts of hydrocupreine (1 molecular proportion), 68 parts of sodium ethylate (1 molecular proportion), 1500 parts of alcohol and 100 parts of ethyl chlorid are heated, for six hours, in an autoclave at a temperature of 75° centigrade. After distilling off the alcohol, the residue is shaken with soda-lye and ether. The new base dissolves in ether while unaltered hydrocupreine remains in the soda-lye. By shaking the ethereal solution with dilute sulfuric acid and neutralizing the boiling acid solution with a base, such for instance as ammonia, ethyl-hydrocupreine sulfate is obtained in fine white needles, which are very difficultly soluble in water, but readily soluble in alcohol. This preparation is, in acid solution, stable toward a permanganate of potassium solution. The new base has the composition $C_{21}H_{28}N_2O_2$, it is obtained by shaking the acid solution with ether and ammonia, evaporating the ether and drying at from 105–110° centigrade in form of colorless bitter tasting crystals, which melt at 120–123° centigrade and are insoluble in water and petroleum-benzin but readily soluble in alcohol and chloroform.

Example III: 312 parts of hydrocupreine (1 molecular proportion) are dissolved in 1000 parts of normal potash lye (1 molecular proportion) and, while being cooled, admixed with 154 parts of di-ethyl sulfate (1 molecular proportion) and shaken for 20 hours. The mixture is then mixed with dilute sulfuric acid and the resulting acid solution is washed with ether and shaken with an excess of soda-lye and ether. On distilling off the ether, ethyl-hydrocupreine remains as an amorphous residue which is purified by converting it into the sulfate. Instead of dissolving the hydrocupreine in aqueous potash lye, the same amount of alcoholic normal potash lye can be used, or the hydrocupreine may be dissolved in 280 parts of 20 per cent. potash lye and double its amount of acetone be added. Shaking is not necessary in these cases. After allowing the solution to stand for several hours in an ice safe, the alcohol or acetone, is distilled off and the residue is further treated as hereinbefore described.

Example IV. 312 parts of hydrocupreine (1 molecular proportion) are heated for 10 hours with a solution of 23 parts of sodium (1 molecular proportion) in 3000 parts of propyl-alcohol (1 molecular proportion) and 78.5 parts of propyl chlorid in an autoclave at a temperature of from 95 to 100 degrees centigrade. It is advisable to use an excess of sodium and propyl-chlorid. The alcohol is then distilled off and the residue is shaken with dilute soda-lye and ether. After evaporating the ethereal solution propyl-hydro-cupreine remains as an amorphous mass which is obtained by crystallization from acetic ether in fine colorless needles having the composition $C_{22}H_{30}N_2O_2$. The melting point is 142 degrees centigrade. The body dissolves readily in alcohol, ether, benzene and chloroform, but with difficulty in water and petroleum-benzin.

Example V: 312 parts of hydrocupreine (1 molecular proportion) are heated in an autoclave at a temperature of from 95 to 100 degrees centigrade for 10 hours with a solution of 23 parts of sodium (1 atomic proportion) in 2000 parts of iso-amyl-alcohol and 106.5 parts of iso-amyl chlorid (1 molecular proportion). The alcohol is then distilled off *in vacuo* and the residue is shaken with soda-lye and ether. The ethereal solution is shaken out with dilute sulfuric acid and the heated acid solution is neutralized with ammonia. The iso-amyl-hydrocupreine sulfate crystallizes out in fine white needles having a melting point of 231 degrees centigrade. The free base has the composition $C_{24}H_{34}N_2O_2$, it forms colorless bitter crystals, which melt at 147° centigrade and are not soluble in water and petroleum-benzin, but readily soluble in alcohol and chloroform.

Example VI: 23 parts of sodium (1 atomic proportion) are dissolved in 1500 parts of allyl alcohol, the solution is then mixed with 312 parts of hydrocupreine (1 molecular proportion) and 76.5 parts of allyl chlorid (1 molecular proportion) and the whole is heated in an autoclave for 20 hours at from 90 to 100 degrees centigrade. After distilling off the allyl-alcohol *in vacuo* the residue is shaken with dilute soda-lye and ether. The allyl-hydrocupreine is extracted from the ethereal solution by means of dilute sulfuric acid and the solution, with the addition of a little animal charcoal, is heated. On cooling the difficultly soluble acid sulfate of allyl-hydrocupreine crystallizes in fine needles having a melting point of 187 degrees centigrade. If the hot solution of the acid sulfate in dilute alcohol be neutralized with ammonia, the neutral sulfate of the allyl-hydrocupreine separates out in colorless needles melting at 226 degrees centigrade. On shaking the sulfate with ether and ammonia, there is obtained after evaporation of the ether, the free base which has the composition $C_{22}H_{28}N_2O_2$. This body forms colorless bitter tasting crystals which are readily soluble in alcohol and chloroform but insoluble in water and petroleum benzin and melt at 81° C.

Example VII: 312 parts of hydrocupreine (1 molecular proportion) are boiled for 1½ days at the reflux condenser with a solution of 23 parts of sodium (1 atomic proportion) in 1500 parts of absolute alcohol and 99 parts (1 molecular proportion) or an excess of ethylene chlorid. After distilling off the alcohol the residue is mixed with soda lye and shaken out with ether. The base is removed from the ethereal solution by means of sulfuric acid and the acid solution is neutralized with ammonia. Chlor-ethyl-hydrocupreine sulfate is thereby separated which is purified by recrystallization out of alcohol, colorless needle-shaped crystals being thus obtained. On analyzing the sulfate $(C_{21}H_{27}N_2O_2Cl)_2.H_2SO_4$ there has been found 8.25% of chlorin, calculated 8.39%. By shaking the acid solution with ammonia and ether the free base having the composition $C_{21}H_{27}N_2O_2Cl$ is obtained from the sulfate. The body forms colorless bitter crystals, which are readily soluble in alcohol and chloroform, but insoluble in water and petroleum-benzin and melt at 164° centigrade.

In the following claims we intend the term alkyl to include both the unsubstituted, as well as the substituted, alkyl radical; and the term substituted derivatives to include both the unsaturated and saturated derivatives as well as the substituted and unsubstituted alkyl derivatives. In the process of producing such derivatives we consider also that the process of producing unsaturated derivatives such as the allyl derivative is equivalent to that of producing the saturated alkyl derivatives.

We claim:

1. The process of producing alkyl derivatives of hydrocupreine which comprises treating hydrocupreine with a suitable alkylizing agent.

2. The process of producing alkyl derivatives of hydrocupreine which comprises treating hydrocupreine with an alkali alcoholate and an alkyl haloid.

3. The process of producing alkyl derivatives of hydrocupreine which comprises treating hydrocupreine with a sodium alcoholate and an alkyl chlorid.

4. The process of producing ethyl-hydrocupreine which comprises treating hydrocupreine with an ethylating agent.

5. The process of producing ethyl-hydrocupreine which comprises treating hydrocupreine with sodium ethylate and ethyl chlorid.

6. As new products substituted derivatives of hydrocupreine containing a substituting group having at least two carbon atoms, substantially as described.

7. As new products alkyl derivatives of hydrocupreine obtainable by alkylating hydrocupreine, containing an alkyl group having at least two carbon atoms, substantially as described.

8. As new products substituted derivatives of hydrocupreine obtainable by alkylating hydrocupreine, containing a substituting group having two carbon atoms, substantially as described.

9. As a new product the ethyl derivatives of hydrocupreine, obtainable by ethylating hydrocupreine, substantially as described.

In testimony whereof we have signed our names to this specification in the presence of two subscribing witnesses.

HEINRICH THRON.
CARL FREUND.

Witnesses:
CARL GRUND,
ELE MEBUS.